(12) United States Patent
Kimura et al.

(10) Patent No.: US 12,079,319 B2
(45) Date of Patent: Sep. 3, 2024

(54) PERSON SPECIFYING DEVICE, PERSON SPECIFYING METHOD, AND RECORDING MEDIUM

(71) Applicant: NEC Corporation, Tokyo (JP)

(72) Inventors: Yosuke Kimura, Tokyo (JP); Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 396 days.

(21) Appl. No.: 17/603,126

(22) PCT Filed: Apr. 15, 2020

(86) PCT No.: PCT/JP2020/016553
§ 371 (c)(1),
(2) Date: Oct. 12, 2021

(87) PCT Pub. No.: WO2020/213638
PCT Pub. Date: Oct. 22, 2020

(65) Prior Publication Data
US 2022/0188394 A1 Jun. 16, 2022

(30) Foreign Application Priority Data
Apr. 18, 2019 (JP) .............................. 2019-079335

(51) Int. Cl.
*G06F 21/32* (2013.01)
*G06V 10/96* (2022.01)
(Continued)

(52) U.S. Cl.
CPC .............. *G06F 21/32* (2013.01); *G06V 10/96* (2022.01); *G06V 20/593* (2022.01); *G06V 40/172* (2022.01)

(58) Field of Classification Search
CPC ...... G06F 21/32; G06V 10/96; G06V 20/593; G06V 40/172
See application file for complete search history.

(56) References Cited

U.S. PATENT DOCUMENTS 8,797,394 B2 * 8/2014 Watanabe ......... B60R 21/01552
701/36
9,014,943 B2 * 4/2015 Mohn ..................... G06F 17/00
701/99
(Continued)

FOREIGN PATENT DOCUMENTS

JP 2008-243217 A 10/2008
JP 2009-201756 A 9/2009
(Continued)

OTHER PUBLICATIONS

JP Office Action for JP Application No. 2022-183225, mailed on Nov. 7, 2023 with English Translation.
(Continued)

*Primary Examiner* — Gary S Gracia
(74) *Attorney, Agent, or Firm* — Sughrue Mion, PLLC

(57) ABSTRACT

A person specifying device includes an authentication unit configured to acquire a captured image capturing a person boarding a moving vehicle, to perform a matching determination as to whether or not the person reflected in the captured image matches a pre-registered person, and to generate person-specifying information representing the person determined via the matching determination; and an authentication-interval-updating unit configured to update a time interval for performing the matching determination to be shorter when failing to achieve a success frequency of authentication above a desired value via the matching determination.

8 Claims, 8 Drawing Sheets

(51) Int. Cl.
*G06V 20/59* (2022.01)
*G06V 40/16* (2022.01)

(56) References Cited

U.S. PATENT DOCUMENTS

| | | | | |
|---|---|---|---|---|
| 9,158,962 | B1* | 10/2015 | Nemat-Nasser | G06T 1/0007 |
| 9,282,180 | B2* | 3/2016 | Kobylarz | H04W 4/027 |
| 9,637,134 | B2* | 5/2017 | Phelan | G07C 5/008 |
| 9,787,910 | B2* | 10/2017 | Kristensen | B60W 30/00 |
| 10,037,689 | B2* | 7/2018 | Taylor | G05D 1/0285 |
| 10,189,352 | B2* | 1/2019 | Virgilio | G07C 5/085 |
| 10,430,666 | B2* | 10/2019 | Koyama | G06T 7/292 |
| 11,050,972 | B1* | 6/2021 | Derbanne | H04N 7/0127 |
| 11,132,532 | B1* | 9/2021 | Livitz | G06V 20/52 |
| 11,315,430 | B2* | 4/2022 | Kusama | G06V 20/56 |
| 11,357,411 | B2* | 6/2022 | Lev | A61B 5/18 |
| 11,769,362 | B2* | 9/2023 | Kochi | G07C 9/37 382/118 |
| 2014/0098232 | A1* | 4/2014 | Koike | B60R 21/01552 348/148 |
| 2014/0201227 | A1* | 7/2014 | Hamilton-Dick | G06F 16/9535 707/758 |
| 2015/0035976 | A1 | 2/2015 | Mayuzumi | |
| 2015/0153834 | A1* | 6/2015 | Akiyama | G06F 3/0481 345/156 |
| 2015/0183409 | A1* | 7/2015 | Lee | B60T 7/12 701/70 |
| 2017/0061719 | A1* | 3/2017 | Ruiters | G06Q 50/205 |
| 2019/0061939 | A1* | 2/2019 | Anand | H04W 12/06 |
| 2019/0102840 | A1* | 4/2019 | Perl | G06Q 40/08 |
| 2019/0180125 | A1* | 6/2019 | Rozploch | G06V 40/166 |
| 2019/0180403 | A1* | 6/2019 | Jiwani | G06Q 10/02 |
| 2019/0256085 | A1* | 8/2019 | Kim | B60W 30/143 |
| 2019/0340453 | A1* | 11/2019 | Papineau | G07B 15/063 |
| 2020/0134294 | A1* | 4/2020 | Liang | G06V 40/16 |
| 2020/0148214 | A1* | 5/2020 | Tamagaki | B60R 21/00 |
| 2020/0160715 | A1* | 5/2020 | Kusama | G06V 40/103 |
| 2020/0386562 | A1* | 12/2020 | Cella | G06N 3/045 |
| 2021/0024075 | A1* | 1/2021 | Eigel | B60W 40/08 |
| 2021/0236024 | A1* | 8/2021 | Bono | G06V 20/59 |
| 2021/0241617 | A1* | 8/2021 | Matsugi | B60R 25/25 |
| 2021/0250554 | A1* | 8/2021 | Liu | H04N 7/181 |
| 2021/0326614 | A1* | 10/2021 | Zhao | G06V 20/597 |
| 2021/0339755 | A1* | 11/2021 | Inagaki | G06V 20/597 |
| 2022/0101651 | A1* | 3/2022 | Tanifuji | G06V 40/70 |
| 2022/0188394 | A1* | 6/2022 | Kimura | G06F 21/32 |
| 2022/0417359 | A1* | 12/2022 | Tokuyama | H04M 1/72454 |
| 2023/0316567 | A1* | 10/2023 | Török | G01C 11/06 382/103 |

FOREIGN PATENT DOCUMENTS

| | | |
|---|---|---|
| JP | 2013-065119 A | 4/2013 |
| JP | 2014-232421 A | 12/2014 |
| JP | 2015-053032 A | 3/2015 |
| JP | 2018-036891 A | 3/2018 |
| JP | 2018-084935 A | 5/2018 |
| JP | 2018-124733 A | 8/2018 |

OTHER PUBLICATIONS

International Search Report for PCT Application No. PCT/JP2020/016553, mailed on Jul. 28, 2020.

* cited by examiner

PERSON SPECIFYING DEVICE, PERSON SPECIFYING METHOD, AND RECORDING MEDIUM

This application is a National Stage Entry of PCT/JP2020/016553 filed on Apr. 15, 2020, which claims priority from Japanese Patent Application 2019-079335 filed on Apr. 18, 2019, the contents of all of which are incorporated herein by reference, in their entirety.

TECHNICAL FIELD

The present invention relates to a person specifying device, a person specifying method, and a recording medium.

BACKGROUND ART

Recently, a plurality of surveillance cameras has been installed in public facilities, transport facilities, buildings, and the like, and therefore engineers have developed a technology for specifying persons upon capturing facial images of persons. In addition, engineers have developed a technology for performing facial recognition upon capturing facial images of drivers of vehicles and for grasping states of drivers to give operation instructions or alarms. Patent Document 1 discloses an operation management system using a management server and a digital tachograph mounted on a vehicle, wherein the digital tachograph is configured to output navigation information including position information, time information, and driver's image information while the management server is configured to instruct a driver how to navigate a vehicle by comparing navigation information with navigation instructions. Patent Document 2 discloses a person search system using an in-vehicle camera, wherein a driver's facial image captured by the in-vehicle camera and vehicle's position information are transmitted to a database so as to store the vehicle's position information upon determining whether the driver's facial image matches a facial image of a search-target person. Patent Document 3 discloses facial recognition device to perform a facial recognition of a person included in moving images taken by a surveillance camera, wherein it is possible to perform facial recognition with high accuracy by verifying detection accuracy upon comparing coordinates of feature points of faces in images of multiple frames included in moving images and by precluding or correcting facial feature points not satisfying predetermined detection accuracy. Patent Document 4 discloses an information processing device configured to process facial information (directions of faces, directions of sights, feature quantities of faces, etc.) relating to faces of drivers who may drive vehicles, wherein it is possible to determine causes of failures in detail when failing to acquire facial information.

CITATION LIST

Patent Literature Document

Patent Document 1: Japanese Patent Application Publication No. 2018-84935
Patent Document 2: Japanese Patent Application Publication No. 2014-232421
Patent Document 3: Japanese Patent Application Publication No. 2013-65119
Patent Document 4: Japanese Patent Application Publication No. 2009-201756

SUMMARY OF INVENTION

Technical Problem

The aforementioned technologies are each designed to specify a person upon comparing the facial feature information of a driver of a vehicle with multiple person feature information recorded on a database. However, it is necessary to perform complex calculation processes when calculating the facial feature information of a person taken by an in-vehicle camera and when performing a comparison process to compare the person's facial feature information with a large amount of person's feature information recorded on a database. To concurrently specify many persons via facial recognition upon imaging a large number of persons' faces, it is necessary acquire captured images from remote imaging devices connected together through networks although a certain time is be needed to start a remote imaging device. For this reason, it is difficult to specify a person upon successfully recognizing persons' faces with a desired success frequency of authentication. In Patent Document 4, an alarm will be given to a driver when failing to acquire a driver's facial image such that the driver can adjust the positional relationship with a camera while adjusting in-vehicle environments (open/closed states of a driver's side window, an exposure time of a camera, and brightness of lighting, etc.), thus identifying a cause of failure in facial recognition so as to eliminate its impact; however, it is troublesome for a driver to take countermeasures, which in turn makes it difficult to succeed in facial recognition.

The present invention is made in consideration of the aforementioned problems, and therefore the present invention aims to provide a person specifying device, a person specifying method, and a recording medium having recorded thereon a person-specifying program, which can specify a person with a high success frequency of authentication.

Solution to Problem

In a first aspect of the present invention, a person specifying device includes authentication means configured to acquire a captured image capturing a person boarding a moving vehicle, to perform a matching determination as to whether or not the person reflected in the captured image matches a pre-registered person, and to generate person-specifying information representing the person determined via the matching determination; and authentication-interval-updating means configured to update a time interval for performing the matching determination to be shorter when failing to achieve a success frequency of authentication above a desired value via the matching determination.

In a second aspect of the present invention, a person specifying device includes authentication means configured to perform a matching determination as to whether or not a person reflected in a captured image obtained from an imaging device matches a pre-registered person and to generate person-specifying information representing the person determined via the matching determination; and authentication-interval-updating means configured to update a time interval for performing the matching determination to be shorter when failing to achieve a success frequency of authentication above a desired value via the matching determination.

In a third aspect of the present invention, a person specifying method includes the steps of: acquiring a captured image capturing a person boarding a moving vehicle; performing a matching determination as to whether or not the person reflected in the captured image matches a pre-registered person; generating person-specifying information representing the person determined via the matching determination; and updating a time interval for performing the matching determination to be shorter when failing to achieve a success frequency of authentication above a desired value via the matching determination.

In a fourth aspect of the present invention, a storage medium is configured to store a program causing a computer to implement: an authentication function configured to acquire a captured image capturing a person boarding a moving vehicle, to perform a matching determination as to whether or not the person reflected in the captured image matches a pre-registered person, and to generate person-specifying information representing the person determined via the matching determination; and an authentication-interval updating function configured to update a time interval for performing the matching determination to be shorter when failing to achieve a success frequency of authentication above a desired value via the matching determination.

Advantageous Effects of Invention

According to the present invention, when a person-specifying process (or a person authentication process) is performed by way of a matching determination as to whether or not a person reflected in an image capturing a person boarding a moving vehicle matches a person registered in advance, it is possible to achieve a success frequency of authentication above a desired value and to decrease a failure frequency of authentication.

DESCRIPTION OF EXEMPLARY EMBODIMENTS

Figure 1:
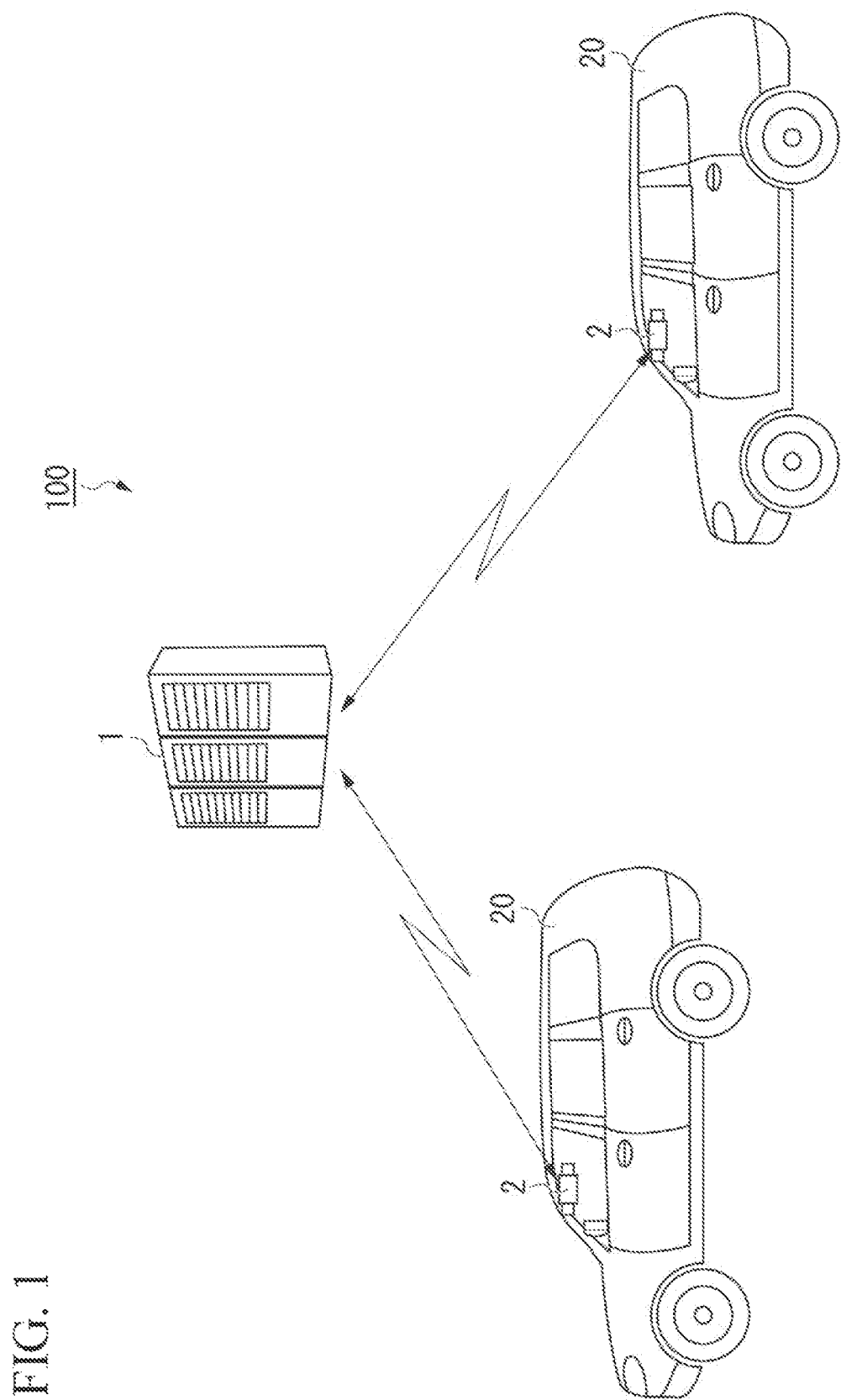
FIG. 1 is a system diagram showing an overview of a person specifying system including a person specifying device according to the exemplary embodiment of the present invention.

A person specifying device and a person specifying method according to the present invention will be described in detail with reference to the accompanying drawings. FIG. 1 shows the overview of a person specifying system 100 including a person specifying device 1 according to the exemplary embodiment of the present invention. In the person specifying system 100 shown in FIG. 1, a plurality of drive recorders is connectible to the person specifying device 1 through communication networks (e.g., wireless communication networks or wired-communication networks). For example, the person specifying device 1 may be a computer server (or a cloud server) which a business operator handling the person specifying system 100 has installed in own office building and which is connectible to communication networks. A plurality of drive recorders 2 is each mounted on a plurality of moving vehicles (e.g., vehicles 20). The drive recorder 2 is equipped with a camera configured to capture at least a facial image of a driver who may drive the vehicle 20, thus transmitting the captured image to the person specifying device 1.

Figure 2:
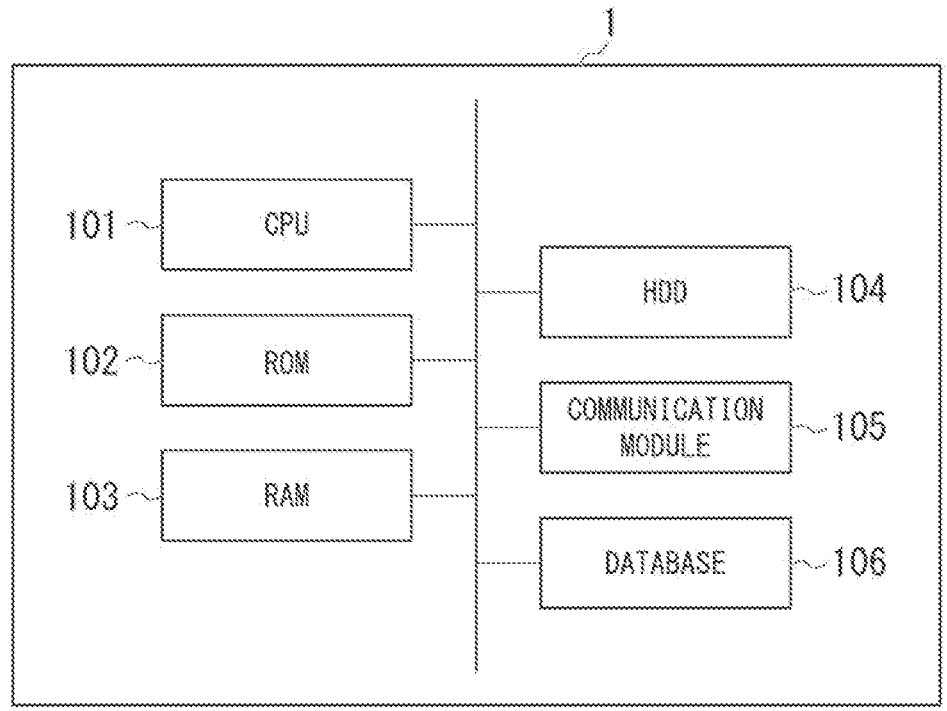
FIG. 2 is a hardware configuration diagram of the person specifying device according to the exemplary embodiment of the present invention.

FIG. 2 is a hardware configuration diagram of the person specifying device 1. The person specifying device 1 is configured of a computer including a CPU (Central Processing Unit) 101, a ROM (Read-Only Memory) 102, a RAM (Random-Access Memory) 103, a HDD (Hard-Disk Drive) 104, a communication module 105, and a database 106.

Figure 3:
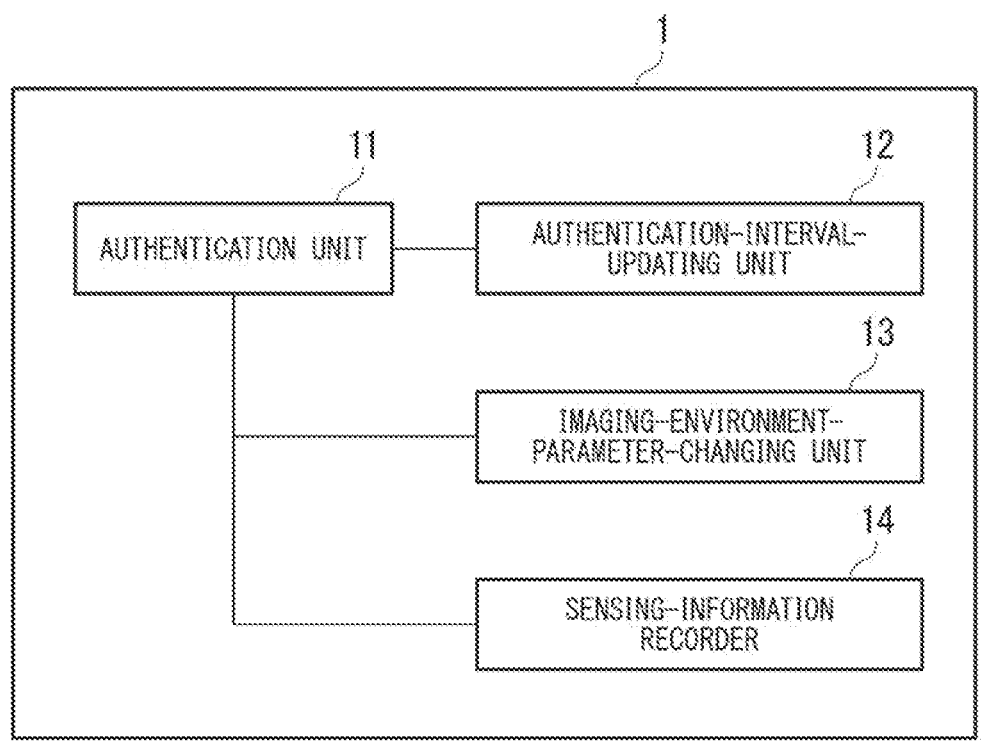
FIG. 3 is a functional block diagram of the person specifying device according to the exemplary embodiment of the present invention.

FIG. 3 is a functional block diagram of the person specifying device 1. The person specifying device 1 starts its operation when electric power is applied thereto, thus executing person-specifying programs which have been stored in advance. Accordingly, the person specifying device 1 may realize various functional parts such as an authentication unit 11, an authentication-interval-updating unit 12, an imaging-environment-parameter-changing unit 13, and a sensing-information recorder 14.

Upon capturing an image of a person using a camera or the like, the authentication unit 11 performs a matching determination as to whether or not the person reflected in the captured image matches a pre-registered person, thus outputting person identification information representing the person identified through the matching determination. The authentication-interval changing unit 12 is configured to reduce a time interval of the matching determination performed by the authentication unit 11 when the authentication units 11 fails to achieve a success frequency of authentication equal to or above a desired value with the matching determination of the authentication unit 11. The exemplary embodiment is designed to reduce the time interval of the matching determination performed by the authentication unit 11 by reducing the time interval in which the drive recorder 2 may transmit the captured image to the person specifying device 1. For example, the authentication-interval changing unit 12 is configured to update the time interval for performing the matching determination to be shorter when the authentication unit 11 fails to achieve a success frequency of authentication equal to or above a desired value when a driver turns on/off power (e.g., an engine or an electric motor) of the vehicle 20 in a short time interval. Alternatively, the authentication-interval changing unit 12 is configured to update the time interval for performing the matching determination to be shorter when the authentication unit 11 fails to achieve a success frequency of authentication equal to or above a desired value due to a low probability of making a successful authentication via the matching determination. When the authentication unit 11 fails to achieve a success frequency of authentication equal to or above a desired value, the imaging-environment-parameter-changing unit 13 is configured to update imaging-environment parameters of the drive recorder 2 (serving as one example of an imaging device configured to generate captured images subjected to authentication). As imaging-environment parameters, for example, it is possible to mention parameters relating to a camera to capture images such as resolutions and the number of images captured in one second (or the number of frames), parameters relating to the position of a driver (e.g., a seated height of a driver or the position of a driver's seat), and parameters relating to variations of running environments (e.g., a change of light radiated to a driver's face).

Figure 4:
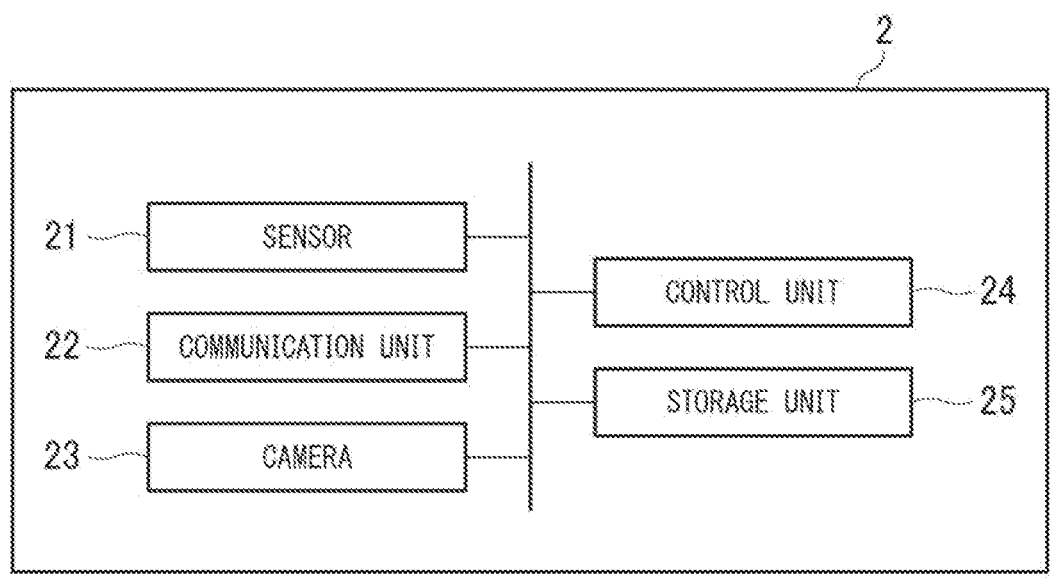
FIG. 4 is a hardware configuration diagram of a drive recorder according to the exemplary embodiment of the present invention.

FIG. 4 is a hardware configuration diagram of the drive recorder 2. The drive recorder 2 includes a sensor 21, a communication unit 22, a camera 23, a control unit 24, a storage unit 25. For example, the sensor 21 may be configured of an acceleration sensor, a speed sensor, a running-distance sensor, or a GPS (Global Positioning System) sensor, i.e., a sensing device for sensing traveling conditions and position information of the vehicle 20 and environment information in the vicinity of the vehicle 20. The communication unit 22 is configured to communicate with the person specifying device 1. The camera 23 is configured to capture an interior image inside the vehicle; however, the camera 23 may capture an exterior image outside the vehicle 20 (e.g., another vehicle or road signs located in the forward direction of the vehicle). In this connection, the camera 23 is set to a predetermined orientation in a certain range of viewing angles which can capture a driver's facial image.

The control unit 24 is configured to control the function of the drive recorder 2. The storage unit 25 is configured to store sensing information including still images and/or moving images taken by the camera 23. In this connection, the control unit 24 of the drive recorder 2 is a computer including a CPU, a ROM, and a RAM.

Figure 5:
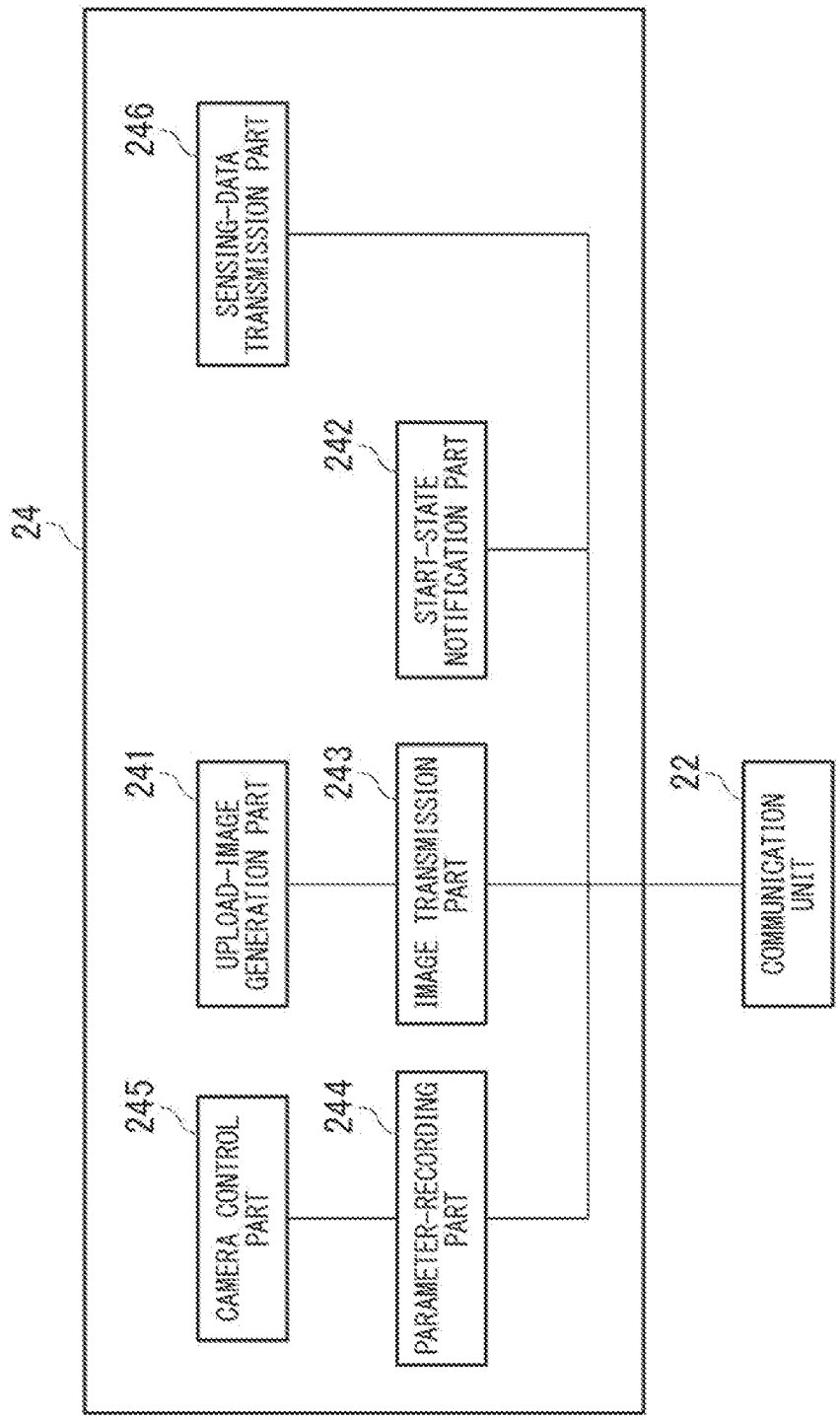
FIG. 5 is a functional block diagram of a control unit of the drive recorder according to the exemplary embodiment of the present invention.

FIG. 5 is a functional block diagram of the control unit 24 of the drive recorder 2. The control unit 24 is configured to execute control programs when the drive recorder 2 starts its operation. Accordingly, the control unit 24 realizes various functional parts such as an upload-image generation part 241, a start-state notification part 242, an image transmission part 243, a parameter-recording part 244, a camera control part 245, and a sensing-date transmission part 246.

When the camera 23 starts to capture vehicle-interior images, the upload-image generation part 241 is configured to acquire image data including at last one of still images and moving images from the camera 23 so as to generate an uploading captured image (or an upload image) based on the image data in a predetermined interval of time.

The start-state notification part 242 is configured to detect an ON/OFF event of the engine of the vehicle 20 so as to transmit to the person specifying device 1 start-state information representing either an engine-ON event or an engine-OFF event. The image transmission part 243 transmits the captured image of the camera 23 to the person specifying device 1. Upon receiving imaging-environment parameters (e.g., parameters used for imaging of the camera 23) from the person specifying device 1 via the communication unit 22, the parameter-recording part 244 is configured to record imaging-environment parameters on the storage unit 25. The parameter-recording part 244 may notify the camera control part 245 of completion of recording imaging-environment parameters. The camera control part 245 is configured to control the camera 23 capturing a driver's image using imaging-environment parameters. The sensing-data transmission part 246 is configured to acquire sensing data of the sensor 21 so as to transmit the sensing data to the person specifying device 1 via the communication unit 22.

Figure 6:
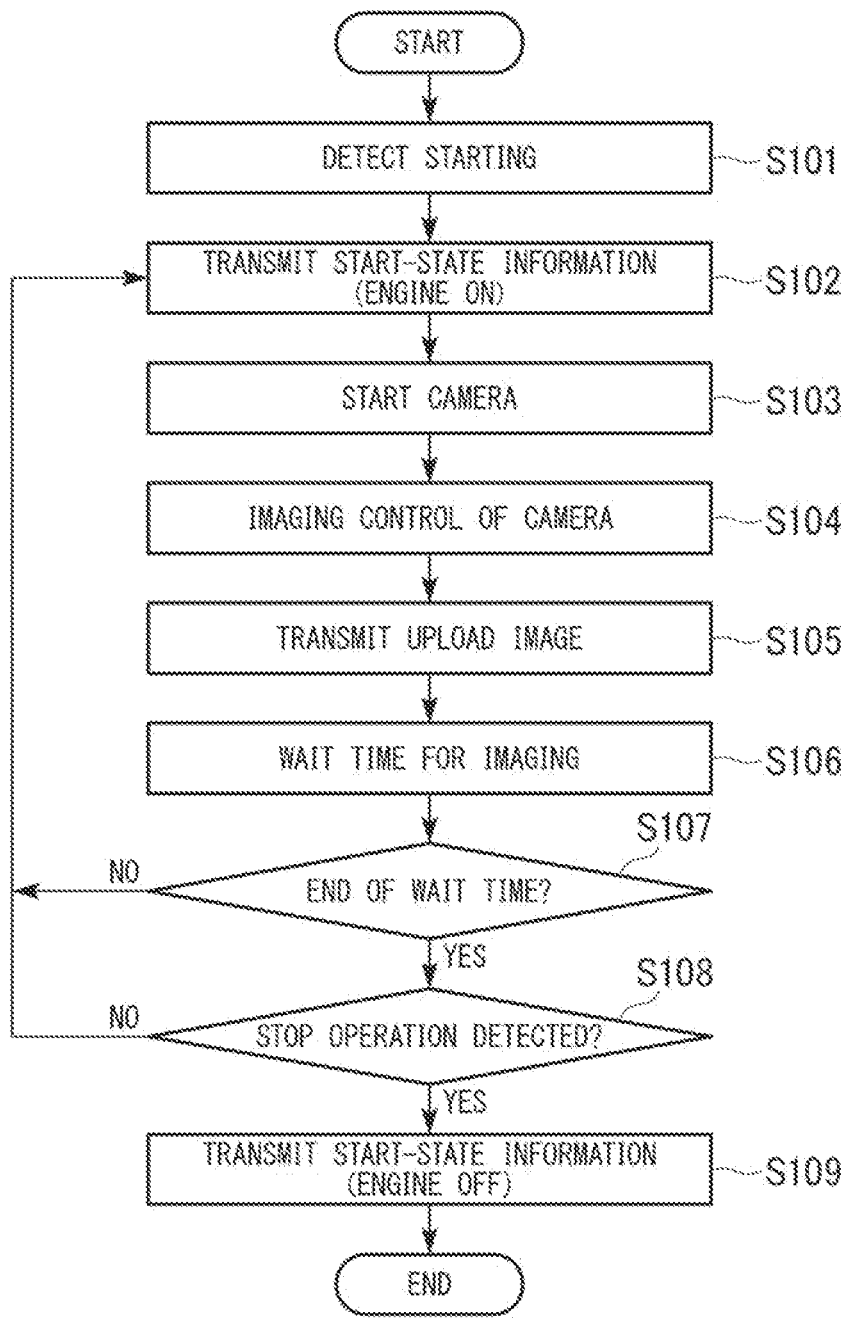
FIG. 6 is a flowchart showing a procedure of the drive recorder according to the exemplary embodiment of the present invention.

FIG. 6 is a flowchart showing the procedure of the drive recorder 2 (i.e., steps S101 through S109). When a driver starts the engine of the vehicle 20 using a smart key or the like, the drive recorder 2 detects an engine-ON event (S101). The start-state notification part 242 of the control unit 24 generates start-state information including the engine-ON event, an engine-ON time, and identification information (ID) of the drive recorder 2 so as to instruct the communication unit 22 to transmit the start-state information. The communication unit 22 transmits the start-state information (i.e., the engine-ON event) to the person specifying device 1 (S102). The person specifying device 1 stores the engine-ON event, the engine-ON time, and the ID of the drive recorder 2, which are included in the start-state information, in association with each other.

Due to an engine start of the vehicle 20, the camera control part 245 starts to operate the camera 23 (S103). For example, the camera control part 245 supplies electric power to the camera 23. In this case, it is necessary to consider predetermined times such as the time needed for the drive recorder 2 to completely start its operation due to the engine start of the vehicle 20, the time needed for the camera 23 to start its operation after the starting of the drive recorder 2, and the time needed for a transition to a communication-ready state when the drive recorder 2 accesses a base station device or the like.

The camera control part 245 of the control unit 24 of the drive recorder 2 reads imaging-environment parameters from the storage unit 25. The camera control part 245 carries out an imaging control of the camera 23 using the imaging-environment parameters (S104). Accordingly, the camera 23 can capture an image of a driver of the vehicle 20 so as to send the captured image to the control unit 24. The camera 23 is configured to capture a driver's image in a predetermined interval of time, thus sending the captured image to the control unit 24. In this connection, the camera may capture either still images or moving images. When the camera 23 captures still images, the camera 23 will send multiple sheets of captured images to the control unit 24 under the control of the camera control part 245. The upload-image generation part 241 of the control unit 24 generates an upload image including the captured image from the camera 23 so as to send the upload image to the image transmission part 243. In a communication-ready state when the drive recorder 2 may access a base station device, the image transmission part 243 instructs the communication unit 22 to transmit the upload image. Accordingly, the communication unit 22 will transmit the upload image to the person specifying device 1 (S105).

The camera control part 245 waits for imaging of the camera 23 depending on a predetermined wait time (S106). The camera control part 245 determines whether or not the wait time has elapsed (S107). At completion of the wait time, the camera control part 245 controls imaging of the camera 23. Accordingly, the camera 23 may repeatedly capture a driver's image so as to send the captured image to the control unit 24.

Next, the start-state notification part 242 detects an engine-OFF event when a driver stops the engine of the vehicle 20 (S108). The start-state notification part 242 instructs the communication unit 22 to transmit start-state information including an engine-OFF event, an engine-OFF time, and the identification information (ID) of the drive recorder 2. The communication unit 22 transmits the start-state information (i.e., an engine-OFF event) to the person specifying device 1 (S109). The person specifying device 1 stores the engine-OFF event, the engine-OFF time, and the ID of the drive recorder 2, which are included in the start-state information, in association with each other.

According to the aforementioned procedure, it is possible to transmit the captured image, which is produced by the camera 23 configured to periodically capture a driver's face, from the drive recorder 2 to the person specifying device 1. Upon receiving an authentication-interval-updating request, the parameter-recording part 244 of the control unit 24 of the drive recorder 2 stores on the storage unit 25 new imaging control parameters such as the number of captured images, resolutions, an imaging time, and an imaging-wait time, which are included in the authentication-interval-updating request. In addition to the aforementioned procedure, while the engine of the vehicle 20 is being started, the sensing-data transmission part 246 may acquire sensing data from the sensor 21 so as to consecutively transmit the sensing data to the person specifying device 1 via the communication unit 22. In this connection, the sensing data may include the identification information (ID) of the drive recorder 2.

Figure 7:
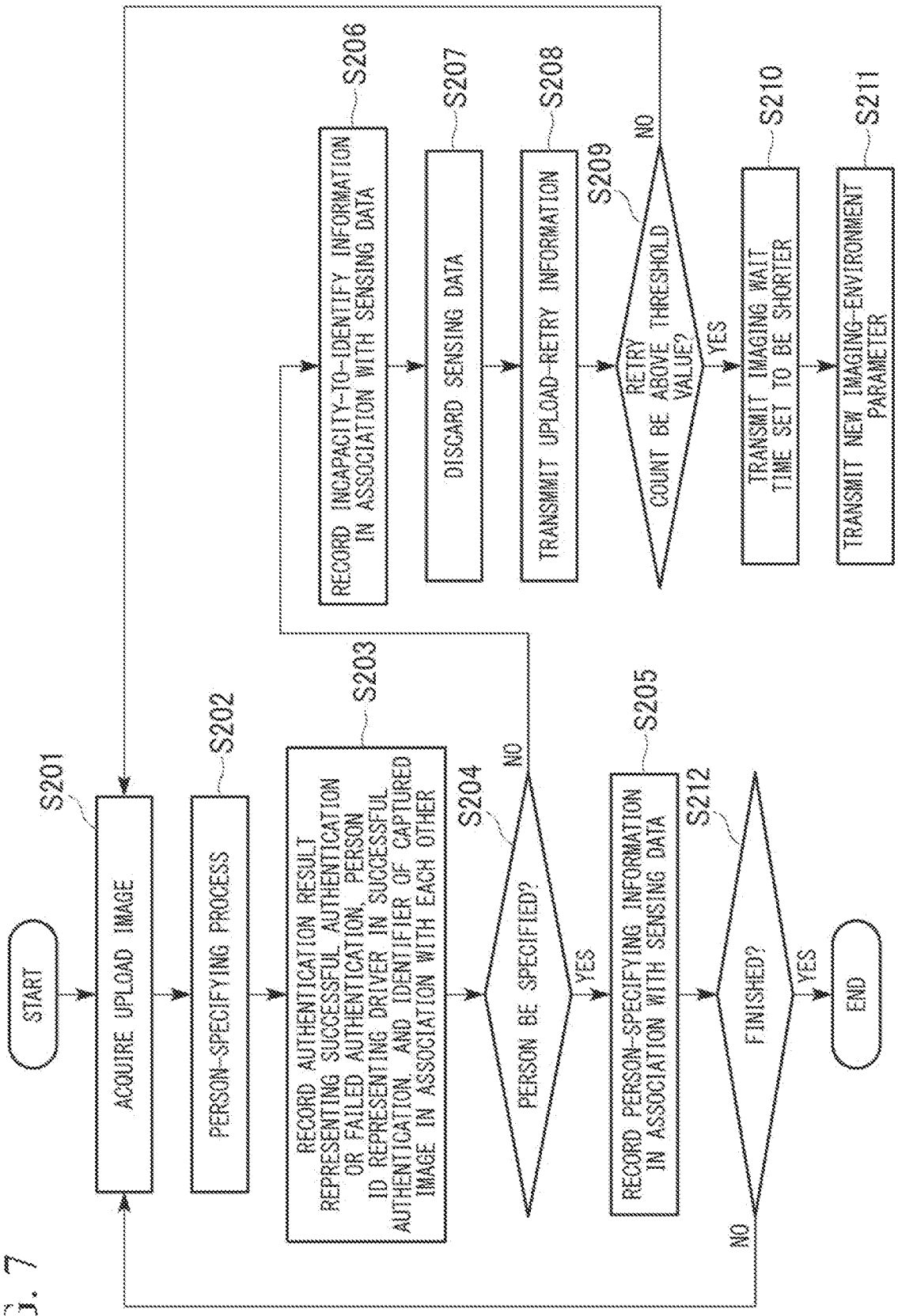
FIG. 7 is a flowchart showing a procedure of the person specifying device according to the exemplary embodiment of the present invention.

FIG. 7 is a flowchart showing the procedure of the person specifying device 1 (i.e., steps S201 through S212). The person specifying device 1 is configured to acquire upload images from the drive recorders 2 mounted on multiple vehicles 20, and therefore the person specifying device 1 is configured to carry out a person-specifying process with a driver of the vehicle 20 using the upload images. Next, the person-specifying process using an upload image received from the drive recorder 2 mounted on a single vehicle 20 will be described with reference to FIG. 7.

At first, the person specifying device 1 receives upload images, which are sent to the authentication unit 11 (S201). The authentication unit 11 acquires multiple sheets of captured images included in upload images. As captured images, it is possible to use multiple frame images extracted from still images captured by the camera 23 of the drive recorder 2 in a predetermined interval of time or moving images captured by camera 23. For example, the person specifying device 1 is configured to acquire ten sheets of captured images at once. The authentication unit 11 carries out a person-specifying process with respect to a person reflected in ten sheets of captured images (S202).

Specifically, the authentication unit 11 is configured to calculate feature information of a person's face reflected in one sheet of a captured image. It is possible to calculate feature information using known technology (e.g., a technology of calculating feature quantity of a person's face). A plurality of feature information representative of faces of many persons (or drivers) has been recorded on the storage unit (e.g., the database 106) of the person specifying device 1. The feature information represents feature information representative of faces of persons who may be predetermined as a driver of the vehicle 20. The authentication unit 11 detects the feature information of a person's face reflected in captured images acquired from the drive recorder 2 so as to determine the feature information most-closely resembling the detected feature information from a plurality of feature information recorded on the database 106. At this time, the authentication unit 11 is configured to calculate a similarity score of the feature information of a person's face detected from captured images (hereinafter, simply referred to as feature information of captured images) compared to the feature information most-closely resembling the detected feature information (hereinafter, simply referred to as the recorded feature information of the database 106). The authentication unit 11 determines a successful authentication when the similarity score is equal to or above a threshold value (i.e., a prescribed value of a similarity score suitable for specifying a person). The authentication unit 11 determines a failed authentication when the similarity score is less than the predetermined threshold value. The authentication unit 11 reads from the database 106 the person's identification information (or a person's ID) recorded on the database 106 in association with the recoded feature information of the database 106 which is used for successful authentication. The authentication unit 11 stores on the storage unit (e.g., RAM 103) the ID of the drive recorder 2 which transmitted an upload image including a captured image representative of an authentication target, the authentication result representing a successful authentication or a failed authentication, and the person's ID representing a driver who was authenticated successfully, and the identifier of a captured image in association with each other (S203). Subsequently, the authentication unit 11 may repeatedly execute the aforementioned process with respect to multiple captured images included in upload images.

Figure 8:
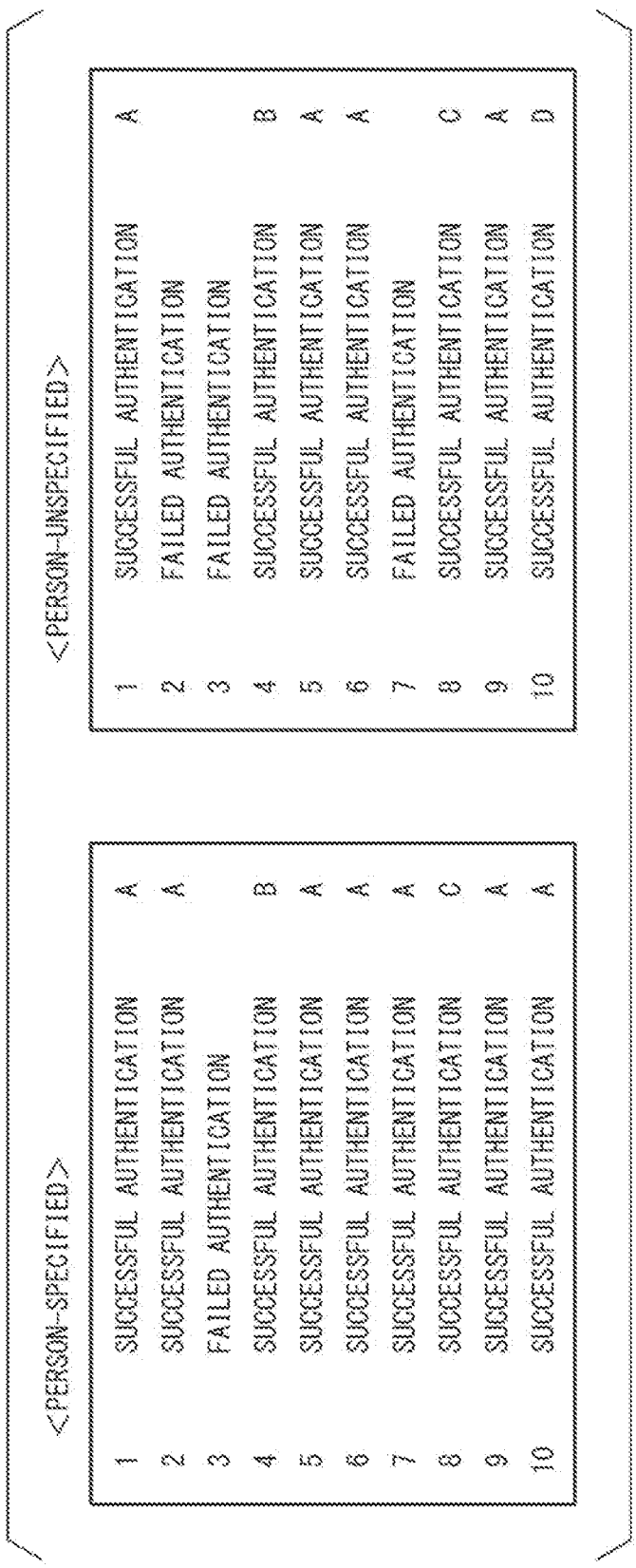
FIG. 8 is a data structure diagram showing data examples of persons' authentication results produced by the person specifying device according to the exemplary embodiment of the present invention.

FIG. 8 is a data structure diagram showing data examples of persons' authentication results produced by the authentication unit 11 of the person specifying device 1. The exemplary embodiment illustrates two patterns of authentication results of captured images with respect to a person-specified data structure (i.e., the left-side table of FIG. 8) and a person-unspecified data structure (i.e., the right-side able of FIG. 8). Each data structure shows authentication results of ten sheets of captured images (having identifications 1 through 10), each of which refers to an authentication result (i.e., a successful authentication or a failed authentication) and an ID of a person specified upon a successful authentication (A through D). In the person-specified data structure, seven sheets of captured images having identifiers 1, 2, 5, 6, 7, 9, 10 among ten sheets of captured images are each regarded as a successful authentication such that the ID of a person reflected in captured images is specified as "A". Among other captured images, the captured image of identifier 3 is regarded as a failed authentication; the captured image of identifier 4 indicates the person's ID "B"; the captured image of identifier 8 indicates the person's ID "C". That is, a ratio of captured images each indicating a successful authentication of the person's ID "A" to all captured images will be 70%. The authentication unit 11 determines whether or not a person can be specified based on authentication results (S204).

When a threshold value relating to a ratio (or a likelihood) of captured images which can be used to specify a predetermined person among multiple captured images is set to 65%, the authentication unit 11 can output the information of a person A as the person-specifying information since the person-specifying data structure may specify the person A (i.e., a person identified by a person's ID "A") with a probability of 70% above the threshold value. Accordingly, the person specifying device 1 is able to determine the person A as a driver of the vehicle 20 reflected in captured images included in upload images received from the drive recorder 2. The authentication unit 11 stores the person-specifying information on the storage unit (e.g., the RAM 103). The authentication unit 11 transmits to the sensing-information recorder 14 the person-specifying information including the ID of the drive recorder 2 included in upload images which are used to specify the person A. During the authentication process of the authentication unit 11, the sensing-information recorder 14 receives the sensing data from the drive recorder 2. The sensing-information recorder 14 is configured to record on the database 106 the sensing data relating to the ID of the drive recorder 2 in association with the information of the person A (S205). That is, it is possible to record on the database 106 the information of the person A together with the sensing data detected by the drive recorder 2 of the vehicle 20 driven by the person A. Accordingly, the person specifying device 1 may analyze the driving status of the person A to produce driving-result information of the person A with reference to the database 106. Thereafter, the person specifying device 1 may determine whether to exit the person-specifying process (S212).

The person-unspecified data structure includes authentication results of ten sheets of captured images and the person's ID when successfully authenticated. Among ten sheets of captured images (having identifiers 1 through 10), four sheets of captured image of identifiers 1, 5, 6, 9 are each regarded as a successful authentication so as to determine the ID of a person reflected in captured images as "A". Among other captured images, three sheets of captured images of identifiers 2, 3, 7 are each regarded as a failed authentication; the captured image of identifier 4 indicates the person's ID "B"; the captured image of identifier 8 indicates the person's ID "C"; the captured image of identifier 10 indicates the person's ID "D". That is, a ratio of captured images successfully specifying the person A to ten sheets of captured images is 40%. When a threshold value relating to a ratio (or a likelihood) of captured images used for successfully specifying a predetermined person among multiple sheets of captured images is set to 65%, the person-unspecified data structure cannot determine any person with a probability above the threshold value, and therefore the authentication unit 11 sends person-specifying information as incapacity-to-identify information to the sensing-information recorder 14. The sensing-information recorder 14 records on the database 106 the incapacity-to-identify information relating to the ID of the drive recorder 2 in association with the sensing data received from the drive recorder 2 (S206). The authentication process of the authentication unit 11 may be one mode of a procedure for determining a success or a failure in person authentication and for determining whether or not to specify any person based on the person-specifying information, which is determined via matching as to a person reflected in multiple captured images which are consecutively captured by the drive recorder 2 in a lapse of time, as well as a likelihood as to whether the person-specifying information represents a predetermined person.

The person-specifying information includes the ID of the drive recorder 2. When the person-specifying information indicates an incapacity to identify any person, the sensing-information recorder 14 determines the sensing data corresponding to the ID of the drive recorder 2 included in the person-specifying information. Subsequently, the sensing-information recorder 14 discards the sensing data which is determined in correspondence with the person-specifying information indicating an incapacity to identify any person (S207). As described above, the person specifying device 1 is able to discard the sensing data when it is not possible to specify a person who may drive the vehicle 20.

The drive recorder 2 waits for an imaging operation in a predetermined wait time; hence, the drive recorder 2 may generate an upload image again so as to transmit the upload image to the person specifying device 1. Every time the person specifying device 1 receives an upload image from the drive recorder 2, the authentication unit 11 repeatedly performs the aforementioned person-specifying process. Upon determining an incapacity to identify any person, the authentication unit 11 generates upload-retry information of captured images so as to transmit the upload-retry information to the drive recorder 2 via the communication module 105 (S208). When the drive recorder 2 receives the upload-retry information, the camera control part 245 controls the camera 23 to capture images without waiting for a wait time. Accordingly, the drive recorder 2 generates an upload image again so as to transmit the upload image to the person specifying device 1.

The authentication unit 11 is configured to count the number of times (or a retry count) to transmit the upload-retry information to the drive recorder 2. The authentication unit 11 determines whether or not the retry count reaches a predetermined threshold value or more (S209). Upon determining that the retry count reaches the predetermined threshold value or more, the authentication unit 11 determines to update the time interval of the authentication process (or the authentication interval) to be shorter. This is one mode of a procedure to determine an incapacity to achieve a success frequency of authentication equal to or above a desired value when the authentication unit 11 is incapable of specifying a predetermined person with a likelihood above a predetermined threshold value with a predetermined ratio or more on the basis of the person-specifying information representative of a person specified based on a predetermined number of captured images as well as the likelihood that the person-specifying information represents the predetermined person. The authentication unit 11 instructs the authentication-interval-updating unit 12 to reduce the authentication interval with respect to the ID of the drive recorder 2.

The authentication-interval-updating unit 12 is configured to store an imaging-wait time corresponding to the authentication interval with respect to each drive recorder 2. With reference to the imaging-wait time for each drive recorder 2, the authentication-interval-updating unit 12 sets again a shorter imaging-wait time with respect to the ID of the drive recorder 2 acquired from the authentication unit 11 so as to transmit the shorter imaging-wait time as a new imaging-wait time to the drive recorder 2 (S210). In this connection, it is possible to set a new imaging-wait time by reducing the original imaging-wait time by a predetermined time. The authentication-interval-updating unit 12 transmits the new imaging-wait time to the drive recorder 2 via the communication module 105. Upon receiving the new imaging-wait time, the drive recorder 2 updates the imaging-wait time, which has already been recorded by the parameter-recording part 244, with the new imaging-wait time. The camera control part 245 controls an imaging operation of the camera 23 according to the new imaging-wait time. This may reduce the time interval for the drive recorder 2 to transmit upload images, thus reducing the person-specifying process (i.e., the time interval of the person authentication process of the authentication unit 11) with the person specifying device 1.

As described above, it is necessary to consider a predetermined time such as a time needed for the drive recorder 2 to completely start its operation due to an engine start of the vehicle 20, a time needed to start the camera 23 after the starting of the drive recorder 2, and a time needed for a transition to a communication-ready state in which the drive recorder 2 accesses a base station. In addition, it is necessary to consider a time needed for the drive recorder 2 to complete transmitting captured images of the camera (or upload images) to the person specifying device 1. In particular, due to a small capacity of communication lines laid between the drive recorder 2 and the person specifying device 1, it is necessary to take a relatively long time for completion of transmission of captured images. An unwanted situation in which the person specifying device 1 cannot process driver's images captured by the camera 23 may occur when a driver repeatedly turns on and off the engine of the vehicle 20, wherein the person specifying device 1 completely fails to specify the driver of the vehicle 20. When the vehicle 20 (e.g., a truck used to deliver goods) may depart from a delivery center and go around residences in the neighborhood of a predetermined area (e.g., an area managed by a delivery center) to deliver packages, for example, a driver may repeatedly turn on and off the engine of the vehicle 20 in a relatively short time every time the driver loads and delivers goods. In this case, the person specifying device 1 should set a shorter imaging-wait time for the drive recorder 2 so as to reduce the time interval in the person-specifying process (i.e., the time interval of a person's authentication process) such that the drive recorder 2 may repeatedly transmit captured images (or upload images) to the person specifying device 1, and therefore it is possible to increase a success frequency of authentication with respect to a person reflected in captured images.

As described above, the person specifying device 1 is designed such that the authentication unit 11 can perform a matching determination as to whether or not a person reflected in captured images transmitted from the drive recorder 2 matches a predetermined person (i.e., a pre-recorded person in the database 106), wherein when the matching determination fails to achieve a desired success frequency of authentication, the authentication-interval-updating unit 12 updates the time interval of making a matching determination (or an authentication interval) to be shorter.

The person specifying device 1 may update imaging-environment parameters of the camera 23 with new parameters instead of the aforementioned process in which the authentication-interval-updating unit 12 updates the authentication interval with a shorter authentication interval or in addition to the process of updating the authentication interval with a shorter authentication interval. In this connection, it is necessary for the camera 23 to capture clear person's images by updating imaging-environment parameters.

In this case, when the number of times (or the retry count) to transmit the upload-retry information becomes equal to or above a predetermined threshold value, the authentication unit 11 determines to update imaging-environment parameters in the camera 23. The authentication unit 11 sends to the imaging-environment-parameter-changing unit 13 an instruction to improve picture quality of captured images of the camera 23 using imaging-environment parameters. With reference to multiple pre-recorded imaging-environment parameters, the imaging-environment-parameter-changing unit 13 sets new imaging-environment parameters with respect to the drive-recorder ID obtained from the authentication unit 11, thus transmitting new imaging-environment parameters to the drive recorder 2 indicated by the drive-recorder ID.

In this connection, it is possible to use predetermined imaging-environment parameters as new imaging-environment parameters. As imaging-environment parameters to be changed by the imaging-environment-parameter-changing unit 13, it is possible to mention various types of parameters. When imaging-environment parameters include resolutions and the number of sheets of captured images for each second, for example, new imaging-environment parameters may increase the resolutions and the number of sheets of captured images for each second. When imaging-environment parameters include a zoom function of the camera 23, new imaging-environment parameters may increase a zoom value of the camera 23 to enlarge captured images in size. When sensing data obtained from the drive recorder 2 indicates a degree of darkness in the vehicle 20, it is possible to set imaging-environment parameters to increase an exposure of the camera 23 when the degree of darkness is below a predetermined threshold value (e.g., nighttime). Alternatively, it is possible to set imaging-environment parameters to increase an imaging time of the camera 23 (e.g., to increase the number of captured images included in an upload image subjected to one-time transmission).

Subsequently, the imaging-environment-parameter-changing unit 13 transmits new imaging-environment parameters to the drive recorder 2 identified by the drive-recorder ID (S211). Upon receiving new imaging-environment parameters, the driver recorder 2 updates imaging-environment parameters pre-recorded by the parameter-recording part 244 with new imaging-environment parameters. The camera control part 245 controls an imaging operation of the camera 23 according to new imaging-environment parameters. Accordingly, it is possible to produce images that can easily identify persons by formulating captured images included in upload images transmitted by the drive recorder 2; hence, it is possible for the person specifying device 1 to improve a success frequency of authentication.

According to the aforementioned procedure, the person specifying device 1 may update the time interval of a matching determination to be shorter when the person specifying device 1 fails to achieve a success frequency of authentication above a desired value due to a low probability of making a successful authentication via the matching determination of the authentication unit 11. This reduces the time interval in transmitting upload images including captured images of the camera 23, and therefore the person specifying device 1 can frequently carry out a person-specifying process to improve a success frequency of authentication.

The person specifying device 1 may update the time interval for performing a matching determination, as to whether a person reflected in a video captured by a camera or the like matches a pre-registered person, to be shorter when the person specifying device 1 fails to achieve a success frequency of authentication above a desired value due to a shorter time interval for turning on and off the power of the vehicle 20 (e.g., an engine or an electric motor). Specifically, the authentication unit 11 of the person specifying device 1 stores the start-state information representing either an engine-ON event or an engine-OFF event. The authentication unit 11 is configured to an average value in the past with respect to an engine-ON period and an engine-OFF period, wherein the authentication unit 11 may send to the authentication-interval-updating unit 12 an instruction to reduce the authentication interval together with the drive-recorder ID when the average value is below a predetermined threshold value while the number of times to transmit the upload-retry information is above a predetermined threshold value. The authentication-interval-updating unit 12 stores an imaging-wait time corresponding to the authentication interval for each drive recorder 2. Among imaging-wait times, the authentication-interval-updating unit 12 transmits to the drive recorder 2 identified by the drive-recorder ID a shorter imaging-wait time which is newly set with respect to the drive-recorder ID obtained from the authentication unit 11. Accordingly, due to a capacity of updating the time interval in a matching determination to be shorter when the person specifying device 1 fails to achieve a success frequency of authentication above a desired value due to a shorter time interval in turning on and off the power of the vehicle 20, it is possible to reduce the time interval in transmitting upload images including captured images of the camera 23, and therefore it is possible for the person specifying device 1 to carry out many person-specifying processes in a relatively-short time, thus improving a success frequency of authentication.

Figure 9:
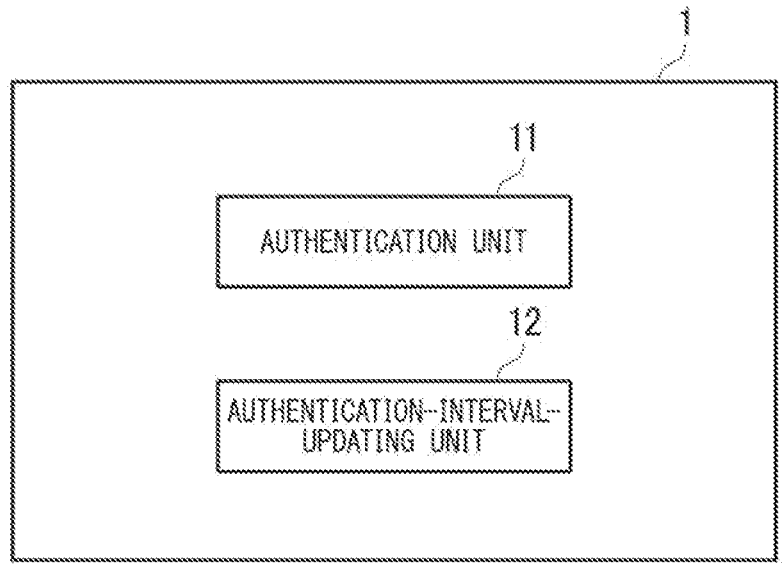
FIG. 9 is a block diagram showing a minimum configuration of the person specifying device according to the exemplary embodiment of the present invention.
Figure 10:
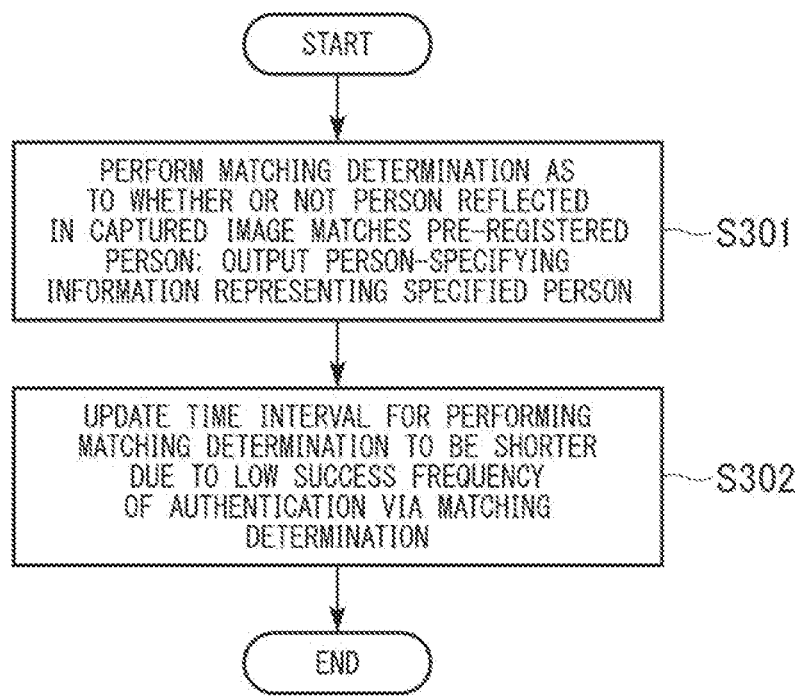
FIG. 10 is a flowchart showing a minimum procedure of the person specifying device according to the exemplary embodiment of the present invention.

Next, technical features of the person specifying device 1 according to the exemplary embodiment of the present invention will be described below. FIG. 9 shows a minimum configuration of the person specifying device 1 according to the exemplary embodiment of the present invention. FIG. 10 shows a minimum procedure of the person specifying device 1 according to the exemplary embodiment of the present invention (steps S301, S302). As shown in FIG. 9, the person specifying device 1 includes at least the authentication unit 11 and the authentication-interval-updating unit 12. The authentication unit 11 performs a matching determination as to whether or not a person reflected in images captured by a camera or the like matches a pre-registered person, thus producing person-specifying information representing a person specified via the matching determination (S301). Due to a failure to achieve a success frequency of authentication above a desired value via the matching determination, the authentication-interval-updating unit 12 updates the time interval in the matching determination to be shorter (S302).

In the above descriptions, the person specifying device 1 may exemplify a server device configured to wirelessly communicate with the drive recorder 2; but this is not a restriction. For example, the person specifying device 1 may be installed inside the vehicle 20 such that the person specifying device 1 can be connected to the drive recorder 2 using wireless communication or wired communication. Alternatively, the function of the person specifying device 1 can be embedded inside the drive recorder 2. In this case, programs relating to a person-specifying process should be recorded on the storage unit 25 of the drive recorder 2.

The aforementioned devices (e.g., the person specifying device 1, the drive recorder 2, etc.) may include computer systems, in which the foregoing processes are stored as programs on computer-readable storage media. For this reason, a computer (e.g., a CPU or a processor) is configured to read and execute programs to realize the foregoing processes. As computer-readable storage media, for example, it is possible to mention magnetic disks, magneto-optical disks, CD-ROM, DVD-ROM, semiconductor and the like. It is possible to deliver programs to a computer through communication lines such that the computer can execute programs.

The foregoing programs may achieve some of the foregoing functions. In addition, the foregoing programs may be differential programs (or differential files) which can be combined with pre-installed programs of the computer system so as to realize the foregoing functions.

Lastly, the present invention is not necessarily limited to the foregoing embodiments, and therefore the present invention may embrace various modifications and design changes within the technical scope as defined by the appended claims.

The present application claims the benefit of priority on Japanese Patent Application No. 2019-79335 filed on Apr. 18, 2019, the subject matter of which is hereby incorporated herein by reference.

INDUSTRIAL APPLICABILITY

The present invention is designed to determine whether a facial image of a driver captured by a camera mounted on a vehicle may match a pre-registered person, whereby it is possible to specify any persons by capturing facial images of a different person than a driver in a vehicle or another person outside the vehicle (e.g., a pedestrian). In this connection, the technical feature of the present invention configured to improve a success frequency of authentication by updating a time interval for executing a matching determination (or a time interval for executing a person's authentication process) as to whether or not a person reflected in captured images may match a pre-registered person should not be solely applied to an authentication process of any member boarded on a vehicle but be applicable to any person's authentication processes carried out in transportation systems or public facilities.

REFERENCE SIGNS LIST

1 person specifying device
2 drive recorder
11 authentication unit (authentication means)
12 authentication-interval-updating unit (authentication-interval-updating means)
13 imaging-environment-parameter-changing unit (imaging-environment-parameter-changing means)
14 sensing-information recorder (sensing-information recording means)
20 vehicle
241 upload-image generation part (upload-image generation means)
242 start-state notification part (start-state notification means)
243 image transmission part (image transmission means)
244 parameter-recording part (parameter-recording means)
245 camera control part (camera control means)
246 sensing-data transmission part (sensing-data transmission means)

What is claimed is:
1. A person specifying device comprising:
a memory storing instructions; and
at least one processor configured to execute the instructions to:
  acquire a captured image capturing a person boarding a moving vehicle,
  perform a matching determination as to whether or not the person reflected in the captured image matches a pre-registered person,
  generate person-specifying information representing the person determined via the matching determination;
  update a time interval for performing the matching determination to be shorter when failing to achieve a success frequency of authentication above a desired value via the matching determination; and update the time interval for performing the matching determination to be shorter due to an incapacity of achieving the success frequency of authentication above the desired value due to a shorter time interval in turning on and off power of the moving vehicle.

2. The person specifying device according to claim 1, wherein the at least one processor is configured to execute the instructions to update the time interval for performing the matching determination to be shorter due to an incapacity of achieving the success frequency of authentication above the desired value which arises from a low probability of making a successful authentication of the person via the matching determination.

3. The person specifying device according to claim 1, wherein the at least one processor is configured to execute the instructions to determine either a successful authentication or a failed authentication with respect to the person based on the person-specifying information, which is determined via the matching determination with respect to the person reflected in each of multiple captured images obtained over a lapse of time, and a likelihood of the person-specifying information indicating a predetermined person.

4. The person specifying device according to claim 3, wherein the at least one processor is configured to execute the instructions to determine a failure of achieving the success frequency of authentication above the desired value when failing to specify the predetermined person using a predetermined number of captured images with the likelihood above a predetermined threshold value based on the person-specifying information determined using the predetermined number of captured images and the likelihood of the person-specifying information indicating the predetermined person.

5. The person specifying device according to claim 1, wherein the at least one processor is configured to execute the instructions to change an imaging-environment parameter used to generate the captured image when failing to achieve the success frequency of authentication above the desired value.

6. A person specifying device comprising:
a memory storing instructions; and
at least one processor configured to execute the instructions to:
  perform a matching determination as to whether or not a person reflected in a captured image obtained from an imaging device matches a pre-registered person,
  generate person-specifying information representing the person determined via the matching determination;
  update a time interval for performing the matching determination to be shorter when failing to achieve a success frequency of authentication above a desired value via the matching determination; and
  update the time interval for performing the matching determination to be shorter due to an incapacity of achieving the success frequency of authentication above the desired value due to a shorter time interval in turning on and off power of the moving vehicle.

7. A person specifying method comprising:
acquiring a captured image capturing a person boarding on a moving vehicle;
performing a matching determination as to whether or not the person reflected in the captured image matches a pre-registered person;
generating person-specifying information representing the person determined via the matching determination;
updating a time interval for performing the matching determination to be shorter when failing to achieve a success frequency of authentication above a desired value via the matching determination; and
updating the time interval for performing the matching determination to be shorter due to an incapacity of achieving the success frequency of authentication above the desired value due to a shorter time interval in turning on and off power of the moving vehicle.

8. A non-transitory storage medium configured to store a program causing a computer to:
acquire a captured image capturing a person boarding a moving vehicle,
perform a matching determination as to whether or not the person reflected in the captured image matches a pre-registered person,
generate person-specifying information representing the person determined via the matching determination;
update a time interval for performing the matching determination to be shorter when failing to achieve a success frequency of authentication above a desired value via the matching determination; and
update the time interval for performing the matching determination to be shorter due to an incapacity of achieving the success frequency of authentication above the desired value due to a shorter time interval in turning on and off power of the moving vehicle.

* * * * *